Sept. 28, 1937.   G. B. PICKOP   2,094,243
NUT CRACKER
Filed April 29, 1936
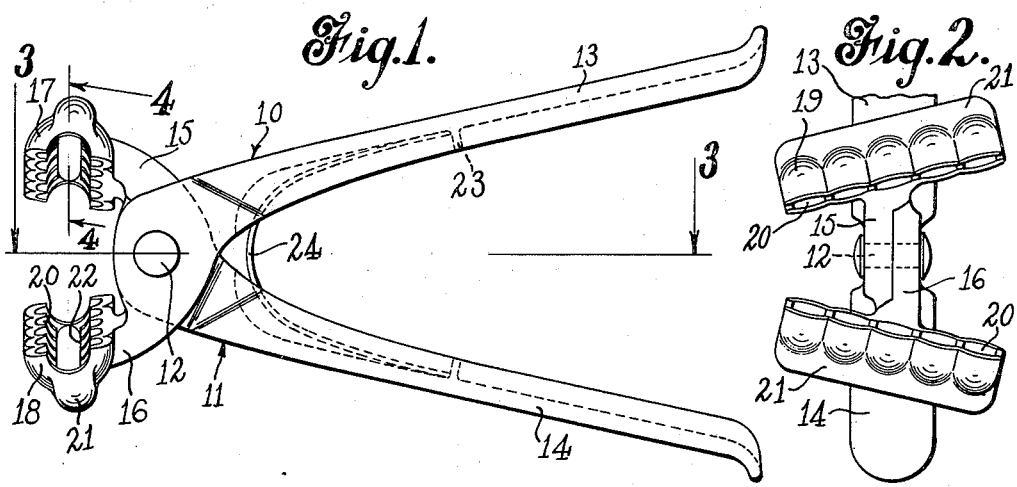
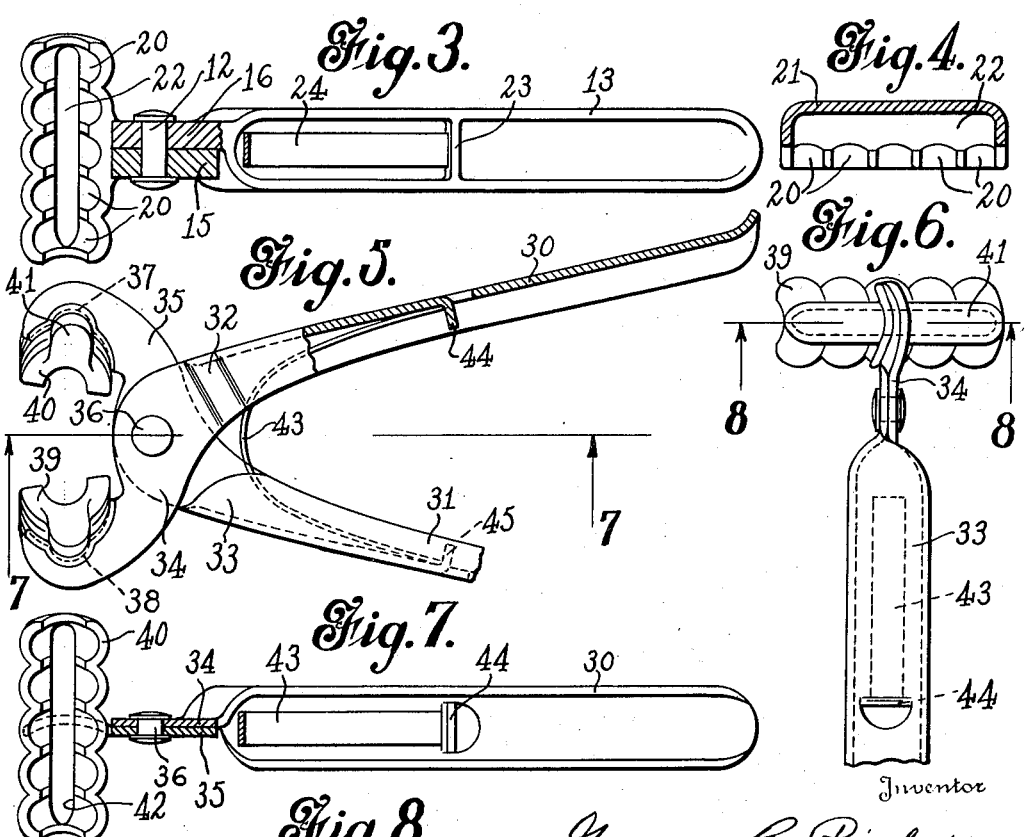
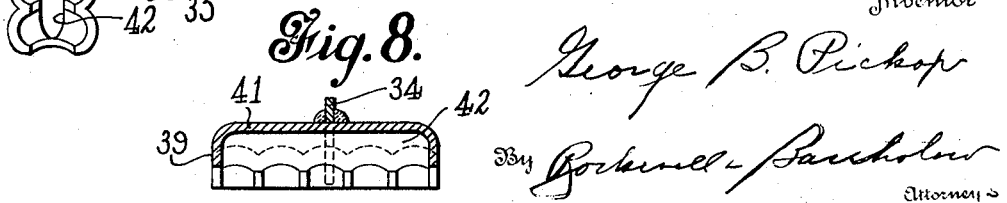

Patented Sept. 28, 1937

2,094,243

UNITED STATES PATENT OFFICE 2,094,243

NUT CRACKER

George B. Pickop, New Haven, Conn., assignor to The New Haven Vibrator Company, Inc., New Haven, Conn., a corporation of Connecticut Application April 29, 1936, Serial No. 76,896

3 Claims. (Cl. 146—13)

My invention relates to nut crackers, and more particularly to a nut cracker constructed in the form of a hand tool comprising a pair of handle members pivoted together between their ends and provided with jaws upon the side of the pivot opposite the handle member. Such an arrangement provides a very effective tool in that each jaw is movable relatively to the other about a common pivot pin, and the tool may be conveniently held in the hand and operated with one hand, and at the same time will develop sufficient power to crack the nut without the exertion of an excessive amount of force on the part of the operator. It will be recognized that after the jaws engage the nut, a relatively small movement of the jaws is required to crack the shell, and for this reason the pivot pin may be so placed that a relatively great leverage is secured without requiring an excessive movement of the handle members. Such a tool may be constructed very cheaply and may be operated with ease and convenience, and at the same time will be of relatively light weight and of sufficiently small size so that it will not be cumbersome to handle.

One object of the present invention is the provision of a nut cracker arranged in the form of a hand tool comprising a pair of pivoted members having handle portions upon one side of the pivot and nut-receiving jaws upon the side of the pivot opposite the handles.

A further object of the invention is to provide a nut cracker in the form of a hand tool wherein the jaws will be so constructed as to receive and hold the nut securely in place.

A still further object of the invention is the provision of a nut cracker of the character described having a novel arrangement for securing a spring between the handle members of the tool to urge the handle members to an open position.

A still further object of the invention is to provide a nut cracker in the form of a hand tool comprising pivoted crossed members with nut-receiving jaws so arranged that the nut may be readily received and clamped therebetween, and also arranged so that when the nut is in place a relatively small closing movement of the jaws is required to shatter the shell of the nut.

As other objects of the invention it is contemplated to provide a nut cracker in the form of a hand tool which is relatively small in size and light in weight, and which at the same time may be conveniently held in and operated by one hand of the user without the expenditure of an excessive amount of effort.

To these and other ends the invention consists in the novel features and combinations of parts to be hereinafter described and claimed.

In the drawing:

Fig. 1 is a side elevational view of a nut cracker embodying my invention, the parts of which are preferably made by the process of casting;

Fig. 2 is a front elevational view of the device shown in Fig. 1;

Figs. 3 and 4 are sectional views on lines 3—3 and 4—4 of Fig. 1, respectively;

Fig. 5 is a side elevational view of a nut cracker embodying my invention, the parts of which are preferably made by a stamping process;

Fig. 6 is a top plan view of the tool shown in Fig. 5;

Fig. 7 is a sectional view on line 7—7 of Fig. 5; and

Fig. 8 is a sectional view of the jaw of the tool taken on line 8—8 of Fig. 6.

In order to illustrate a preferred embodiment of my invention, I have shown a nut cracker in the form of a hand tool the parts of which may be cast or may be made by a stamping process, both of which methods are well known to workers in metal. In Figs. 1 to 4 of the drawing I have shown a tool the parts of which are made by casting, and this tool will now be described.

The tool comprises a pair of crossed members 10 and 11 pivoted together by the pivot pin 12. These members comprise the handle portions 13 and 14 extending upon one side of the pivot pin, which are suitably formed, as, for example, by being of channel shape in cross-section, to be gripped by the fingers and hand of the user.

Adjacent the pivot pin 12 the members 10 and 11 are of flat shape, as shown more especially in Figs. 2 and 3, and cross each other to provide the forwardly diverging ends 15 and 16, by which are carried the jaws 17 and 18.

These jaws, as shown more especially in Figs. 2 and 3, are elongated in form and extend transversely of the members 15 and 16. In cross-sectional form the jaws are of arcuate shape and are transversely corrugated, as shown at 19, to provide partially formed separate wells or recesses 20 to receive the ends of the nut. It will be understood that it is contemplated to place the pointed ends of the nut in these wells or recesses, and for this purpose the jaws are arranged at an angle to each other, as shown in Fig. 2, so that the spread between them is greater at one end than at the other. This provides that the jaws when in separated position may be adapted to receive nuts of various lengths, the shorter nuts being placed within the recesses 20 adjacent the ends of the jaws which are closer together. By this arrangement the nut can be placed at the proper place between the jaws so that the latter will clamp down upon the nut shell after a very slight movement.

The jaws are also provided with a longitudinally extending hollow rib 21 upon their exterior surfaces, which provides an elongated recess 22 upon the interior of the jaws, this recess communicating with the wells or cavities 20. Many nuts, such as pecans, for example, have relatively sharp ends, and in such case the ends of the nuts will be received in the elongated recess 22 and held securely in place by being prevented from movement around the arcuate surface of the jaw.

As stated, the handle members 13 and 14 are channel-shaped in cross-section, and each is provided with a transversely extending lug 23 intermediate the end of the handle and the pivot pin 12. A flat spring 24 of U-shaped design may be inserted between the handle members, and its free ends will snap behind the lugs 23, so that the spring will be held in place by these lugs due to its own resilience. This spring will tend to keep the handle members apart and the jaws in open position, as shown in Fig. 1. This provides a very economical and convenient way of securing the spring in place, and at the same time there will be no tendency for the spring to become dislodged.

It will be apparent that after the nut has been once clamped tightly between the jaws, a very slight movement is necessary to shatter the nut shell. With the jaws arranged in diverging relation, the nut can be placed between them at the proper position so that a very small movement is necessary to clamp the nut in place and begin the cracking operation. There is, therefore, only a small movement of the jaws required for the entire operation, and for this reason I may so position the pivot pin 12 that a relatively great leverage is produced, so that a minimum expenditure of effort is required on the part of the operator.

It will be noted that the forward ends 15 and 16 of the pivoted members are directed upwardly as well as forwardly from the pivot pin 12, so as to give the jaws a relatively great initial spread without the disadvantage of a long leverage upon that side of the pivot.

In Figs. 5 to 8 of the drawing, I have shown a tool which is generally similar to that shown in Figs. 1 to 4, and already described, except that its parts are adapted for manufacture by a metal stamping process. In this instance the handle members 30 and 31 are of relatively light material which may be formed by stamping. The blank is twisted adjacent the points 32 and 33 so as to provide the flat abutting portions 34 and 35 pivoted by the pin 36. The portions 34 and 35 are extended outwardly and forwardly, and are shaped at their ends to provide facing recesses 37 and 38 to receive the jaws 39 and 40.

In this form of my invention, jaws 39 and 40 are made separately from the pivoted handle members, and may be secured to the forward ends thereof by welding or the like. The jaws are also made by a stamping process and in form and shape are substantially like the jaws of the tool shown in Figs. 1 to 4, except that there they are of thinner material. As will be seen, they extend transversely of the forwardly projecting members 34 and 35, and are provided with the longitudinally extending rib 41 to provide the longitudinally extending recess 42 to receive the pointed ends of the nuts. In this case the jaws are also arranged in diverging relation, as in the case of the tool illustrated in Figs. 1 to 4.

The handle members 30 and 31 are urged apart by a flat U-shaped spring 43, the ends of which abut lugs 44 and 45, which in this instance are struck down from the web portion of the handle members. The handle members in this case are also of channel or U-shaped form in cross-section so as to be conveniently grasped by the hand and fingers of the user.

While I have shown and described some preferred embodiments of my invention, it will be understood that it is not to be limited to all of the details shown, but is capable of modification and variation within the spirit of the invention and within the scope of the appended claims.

What I claim is:

1. A nut cracker comprising a pair of members pivoted together between their ends, said members having handle portions at one side of the pivot and having forwardly and outwardly extending portions at the other side of the pivot, elongated jaws carried by said last-named portions, said jaws extending transversely of said pivoted members and arranged in non-parallel relation to present a diverging opening therebetween lengthwise of the jaws, and said jaws being of arcuate shape in cross-section and being provided with separated cavities to receive the ends of the nuts and with longitudinally extending internally facing recesses communicating with said cavities to receive the points on the ends of the nuts.

2. A nut cracker comprising a pair of members pivoted together between their ends, said members having handle portions at one side of the pivot and forwardly and outwardly extending jaw-carrying portions at the other side of the pivot, elongated jaws rigidly secured at their central portions respectively to the forwardly extending portions of the handle members, said jaws being hollow and of arcuate cross-sectional shape, and having transverse divisions to provide separated cavities to embrace a substantial portion of the ends of the nuts, and said jaws being arranged in non-parallel relation to present a diverging opening therebetween in a longitudinal direction.

3. A nut cracker comprising a pair of members pivoted together between their ends, said members having handle portions at one side of the pivot and forwardly and outwardly extending jaw-carrying portions at the other side of the pivot, elongated jaws secured at their central portions respectively to the forwardly extending portions of the handle members, said jaws being hollow and of arcuate cross-sectional shape, and being provided with separated cavities to receive the nuts, said jaws being arranged in non-parallel relation to present a diverging opening therebetween in a longitudinal direction, and each of said jaws having a hollow rib upon its outer surface providing an internally facing recess communicating with said cavities.

GEORGE B. PICKOP.